US012204608B2

(12) United States Patent
Vahadane

(10) Patent No.: US 12,204,608 B2
(45) Date of Patent: Jan. 21, 2025

(54) DUAL ENCODER ATTENTION U-NET

(71) Applicant: Rakuten Group, Inc., Tokyo (JP)

(72) Inventor: Abhishek Vahadane, Bengaluru (IN)

(73) Assignee: Rakuten Group, Inc., Tokyo (JP)

( * ) Notice: Subject to any disclaimer, the term of this patent is extended or adjusted under 35 U.S.C. 154(b) by 325 days.

(21) Appl. No.: 17/063,668

(22) Filed: Oct. 5, 2020

(65) Prior Publication Data

US 2022/0108097 A1 Apr. 7, 2022

(51) Int. Cl.
| | | |
|---|---|---|
| *G06N 3/08* | (2023.01) | |
| *G06F 18/213* | (2023.01) | |
| *G06N 3/045* | (2023.01) | |
| *G06N 3/082* | (2023.01) | |
| *G06V 10/44* | (2022.01) | |
| *G06V 20/69* | (2022.01) | |
| *G06V 10/58* | (2022.01) | |

(52) U.S. Cl.
CPC ........ *G06F 18/213* (2023.01); *G06N 3/045* (2023.01); *G06N 3/082* (2013.01); *G06V 10/44* (2022.01); *G06V 20/695* (2022.01); *G06V 10/58* (2022.01)

(58) Field of Classification Search
CPC ...... G06V 20/695; G06V 10/44; G06V 10/58; G06V 10/7715; G06V 20/69; G06N 3/0454; G06N 3/082; G06K 9/6232
See application file for complete search history.

(56) References Cited

U.S. PATENT DOCUMENTS

| | | |
|---|---|---|
| 2020/0286247 A1 | 9/2020 | Niesen et al. |
| 2020/0380653 A1 | 12/2020 | Tanizawa et al. |
| 2021/0350113 A1* | 11/2021 | Sjögren .................. G06N 3/08 |
| 2021/0350176 A1* | 11/2021 | Klaiman .............. G06F 3/0482 |

FOREIGN PATENT DOCUMENTS

| | | |
|---|---|---|
| JP | 2020-197797 A | 12/2020 |
| WO | 2020/081343 A1 | 4/2020 |

OTHER PUBLICATIONS

Wang, Bo, Shuang Qiu, and Huiguang He. "Dual encoding u-net for retinal vessel segmentation." International conference on medical image computing and computer-assisted intervention. Springer, Cham, 2019. (Year: 2019).*

Vahadane, Abhishek, et al. "Structure-preserving color normalization and sparse stain separation for histological images." IEEE transactions on medical imaging 35.8 (2016): 1962-1971. (Year: 2016).*

Oktay, Ozan, et al. "Attention u-net: Learning where to look for the pancreas." arXiv preprint arXiv: 1804.03999 (2018). (Year: 2018).*

Ren, Yongfeng, Yongtao Yu, and Haiyan Guan. "DA-CapsUNet: A dual-attention capsule U-Net for road extraction from remote sensing imagery." Remote Sensing 12.18 (2020): 2866. (Year: 2020).*

* cited by examiner

*Primary Examiner* — Amandeep Saini
*Assistant Examiner* — Denise G Alfonso
(74) *Attorney, Agent, or Firm* — Sughrue Mion, PLLC

(57) ABSTRACT

A method, computer program, and computer system is provided for predicting features in a binary file, such as an image, an animation, a video, or a sound. The binary file is received. A feature value corresponding to latent space of the binary file is calculated based on a dual-encoder attention-based U-net architecture. A new binary file is generated based on the calculated feature value.

17 Claims, 7 Drawing Sheets

# DUAL ENCODER ATTENTION U-NET

BACKGROUND

1. Field

This disclosure relates generally to the field of machine learning and more particularly to neural networks.

2. Description of Related Art

Binary files, such as images, animations, and sounds, have allowed for the creation and encoding of large amounts of data. For example, in the field of medicine, digital pathology has made it possible to extract information about biological components from whole slide images. Hematoxylin and eosin is a common staining technique used in pathology labs across the world. In a typical implementation, hematoxylin dye stains nuclei by blue while eosin stains cytoplasm and extracellular matrix by pink. Cells and nuclei are the basic elements of tissue, and the statistics of such components can be utilized for novel biomarker development as well as for precise diagnosis. Nuclear size, shape, density, local texture, spatial features in the neighborhood of nucleus and local tissue structure (glands) provide important clues about cancerous activity in the whole slide images. Alternatively, in the field of audio, voice and sound recognition may be used to identify speaker from among groups or the content that a speaker is saying.

SUMMARY

Embodiments relate to a method, system, and computer readable medium for predicting features in binary files, such as an image, an animation, a video, or a sound. According to one aspect, a method for predicting features in a binary file. The method may include receiving a binary file. A feature value corresponding to latent space of the binary file is calculated based on a dual-encoder attention-based U-net architecture. A new binary file is generated based on the calculated feature value.

According to another aspect, a computer system for isolating features in a binary file is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving a binary file. A feature value corresponding to latent space of the binary file is calculated based on a dual-encoder attention-based U-net architecture. A new binary file is generated based on the calculated feature value.

According to yet another aspect, a computer readable medium for predicting features in a binary file is provided. The computer readable medium may include one or more computer-readable storage devices and program instructions stored on at least one of the one or more tangible storage devices, the program instructions executable by a processor. The program instructions are executable by a processor for performing a method that may accordingly include receiving a binary file. A feature value corresponding to latent space of the binary file is calculated based on a dual-encoder attention-based U-net architecture. A new binary file is generated based on the calculated feature value.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Figure 1:
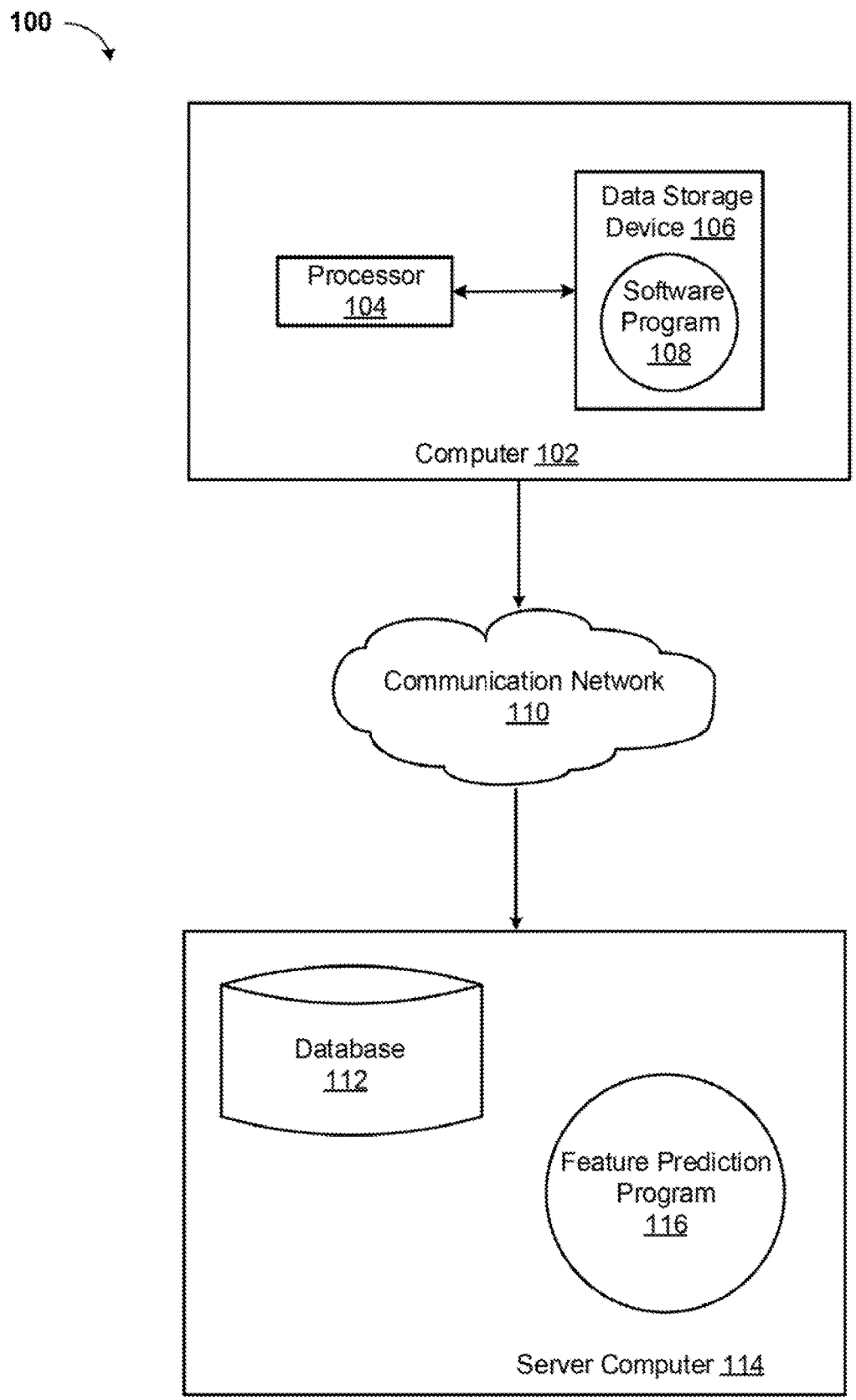
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of machine learning, and more particularly to neural networks. The following described exemplary embodiments provide a system, method and computer program to, among other things, predicting features in binary files. Therefore, some embodiments have the capacity to improve the field of computing by allowing for the prediction of features in a binary file using a dual-encoder attention system. Additionally, some embodiments have the capacity to improve the field of medicine by providing an end-to-end deep learning framework to accurately segment nuclei instances in given hematoxylin and eosin histology images in order to predict cell nuclei and their corresponding boundaries.

As previously described, binary files, such as images, animations, and sounds, have allowed for the creation and encoding of large amounts of data. For example, in the field of medicine, digital pathology has made it possible to extract information about biological components from whole slide images. Hematoxylin and eosin is a common staining technique used in pathology labs across the world. In a typical implementation, hematoxylin dye stains nuclei by blue while eosin stains cytoplasm and extracellular matrix by pink. Cells and nuclei are the basic elements of tissue, and the statistics of such components can be utilized for novel biomarker development as well as for precise diagnosis. Nuclear size, shape, density, local texture, spatial features in the neighborhood of nucleus and local tissue structure (glands) provide important clues about cancerous activity in the whole slide images. However, manual examination of binary files may be tedious. Additionally, variations exhibited in features across varying files, such as variations in opacity, size, shape, and color, may lead to difficulty in automation of the feature prediction. Additional technical challenges arise from touching or overlapping features in binary files. Alternatively, in the field of audio, voice and sound recognition may be used to identify speaker from among groups or the content that a speaker is saying.

Exemplary embodiments, however, use a deep learning approach for predicting and isolating features from binary files. By using a neural network with pseudo-hard attention gates to improvise an attention mechanism for the entire network, the attention-catching capability of the network may be improved. A dual encoder architecture may be used to encode attention prior information, and attention priors may be generated from input images. Additionally, an attention skip module (ASM) may utilize both attention priors and input feature maps to enhance feature prediction performance.

Aspects are described herein with reference to flowchart illustrations and/or block diagrams of methods, apparatuses (systems), and computer readable media according to various exemplary embodiments. It will be understood that each block of the flowchart illustrations and/or block diagrams, and combinations of blocks in the flowchart illustrations and/or block diagrams, can be implemented by computer readable program instructions.

Referring now to FIG. 1, there is shown a functional block diagram of a networked computer environment illustrating a feature prediction system 100 (hereinafter "system") for predicting features in binary files and determining their corresponding boundaries. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 5, the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 6 and 7. The server computer 114 may also be located in a cloud computing deployment model, such as a private cloud, community cloud, public cloud, or hybrid cloud.

The server computer 114, which may be used for predicting features and boundaries within binary files is enabled to run a Feature Prediction Program 116 (hereinafter "program") that may interact with a database 112. The Feature Prediction Program method is explained in more detail below with respect to FIG. 4. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger feature prediction program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. In still another embodiment, the system as a whole may be integrated into and implemented by a single computing device. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the system 100 may perform one or more functions described as being performed by another set of devices of the system 100.

Figure 2:
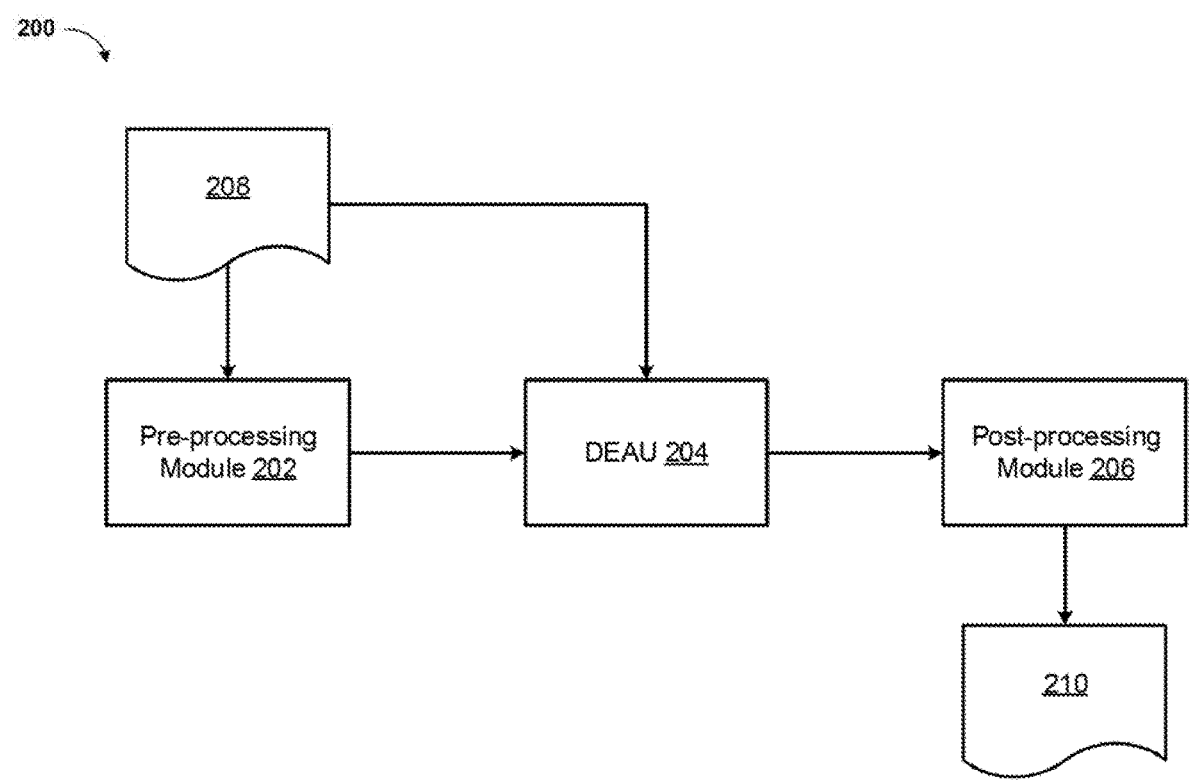
FIG. 2 is a block diagram of a feature prediction system for binary files, according to at least one embodiment.

Referring now to FIG. 2, a block diagram of a feature data encoder system 200 is shown. The feature data encoder system 200 may include, among other things, a pre-processing module 202, a Dual Encoder Attention U-net (DEAU) 204, and a post-processing module 206. The pre-processing module 202 may receive one or more input images 208 and may generate one or more attention priors (e.g., a hematoxylin channel) that may be passed or input to the DEAU 204. The DEAU 204 may include a deep learning architecture which may incorporate an attention mechanism. The DEAU 204 will be described in more detail with respect to FIG. 3. The post-processing module 206 may output feature prediction data 210 as an instance mask based on the output of the DEAU 204.

The post-processing module 206 may use predicted feature and boundary probability maps to further refine the feature prediction data 210. The raw output of the DEAU 204 may include feature prediction data $I_n \in R^{H \times W}$ and boundary prediction data $I_b \in R^{H \times W}$. The post-processing module 206 may semantically segment the features as well as separate touching features. A threshold for $I_n$ and $I_b$ may be calculated from empirically determined threshold values. The binary boundary map $\hat{I}_b$, may be subtracted from binary feature map $\hat{I}_n$, which may result in a feature instance map $z_i$. An energy landscape may be generated in the form of a distance map d for each individually connected component. The distance map may be the distance of each pixel to the background. Feature markers $I_m$ may be generated from $z_i$ by eroding $z_i$ with a disc structuring element of a two pixel radius. The distance map and the markers of isolated features may be used in a marker-controlled watershed technique to obtain an N-array mask of feature instances.

Figure 3:
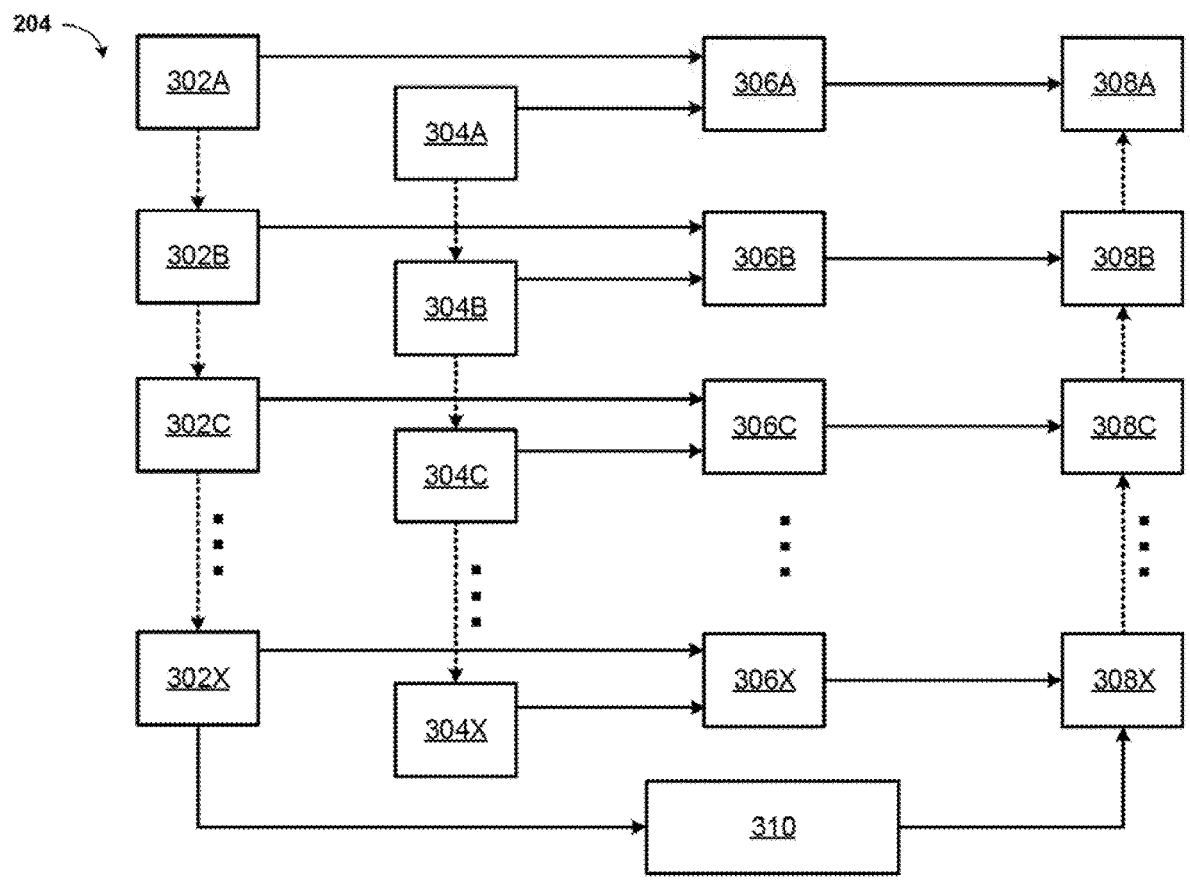
FIG. 3 is a block diagram of a dual-encoder attention unit (DEAU), as depicted in FIG. 2, according to at least one embodiment.

Referring now to FIG. 3, an exemplary Dual encoder Attention U-net (DEAU) 204 as shown in FIG. 2, is depicted. The DEAU 204 may include, among other things, one or more input nodes 302A-302X (e.g., an H&E image encoding path), one or more attention prior processing nodes 304A-304X (i.e., an attention prior encoding path), one or more attention skip modules (ASMs) 306A-306X, one or more output nodes 308A-308X, and a latent space 310. The input nodes 302A-302X, the attention prior processing nodes 304A-304X, and the output nodes 308A-308X may each include one or more convolution kernels (e.g., 3×3 convolution kernel). Each of the input nodes 302A-302X may be successively connected by a max pooling layer (e.g., 2×2 max pooling layer). Each of the attention prior processing nodes 304A-304X may also be successively connected by a max pooling layer (e.g., 2×2 max pooling layer). Each of the input nodes 302A-302X and the corresponding attention prior processing nodes 304A-304X may be connected to the corresponding ASMs 306A-306X by a skip connection. Each of the ASMs 306A-306X may also be connected to the corresponding output nodes 308A-308X by a skip connection. The output nodes 308A-308X may successively feed into one another in a reverse order by an up-sampling connection (e.g., up-sampling factor of 2). The final output node, output node 308A, may have a two-channel output that may include feature and boundary maps, such as those corresponding to cell nuclei.

The DEAU 204 may use a U-Net architecture (i.e., input nodes 302A-302X) and an Attention Encoding Path (AEP) (i.e., attention prior processing nodes 304A-304X), which may take the attention priors as input and may generate meaningful features for segmentation. The dimensions of the new encoding path may be the same as the U-Net architecture. The input to the U-Net architecture may be one or more input images 208 (FIG. 2), while the input to the AEP may be the one or more attention priors. The feature maps obtained from the U-Net architecture and the AEP may be fed to the attention skip modules 306A-306X at different depths of the network.

According to one or more embodiments, in the field of medicine, a hematoxylin channel may be used as the one or more attention priors to segment nuclei. Sparse non-negative matrix factorization (SNMF) may be used to color-normalize H&E stained WSIs. SNMF may factorize H&E image into a stain color matrix and optical density, which may be used for stain separation. The same technique may be used to deconvolve the H&E stained image into separate H and E channels.

According to one or more embodiments, in the field of audio data processing, a sound file may include, for example, voices from one or more speakers. The voice may be separated be separated into one or more channels to identify speakers from among the one or more speakers or identify the content a speaker may be saying.

At each spatial resolution of the skip connection, the corresponding ASM 306A-306X may accept the processed attention feature map $g^l \in R^{F_H}$ and feature map $x^l \in R^{F_{HE}}$ as its two inputs. These vectors may be translated to an intermediate dimension $F_{int}$ by 1×1 convolution with kernels $W_{e1}$ and $W_{e2}$. This may be followed by element-wise addition and non-linear transformation through ReLU function $\sigma_1$ and another 1×1 convolution operation with kernel ($W_{int}$), before passing the output to a sigmoid function σ2. This may generate attention coefficients $\alpha^l \in [0,1]$. An output $\hat{x}^l$ may be obtained by element-wise multiplication of $\alpha^l$ with $x^l$, followed by a 1×1 convolution. As each of the convolution operations may have associated parameters that may be updated during back-propagation by the gradients, the attention mechanism may be called a pseudo-hard attention gate. At a skip connection 1, the attention coefficient may be given by:

$$\alpha^l = \sigma_2(W_{int}^T(\sigma_1(W_{e1}^T x^l + W_{e2}^T g^l + b_1)) + b_2),$$

where b1 and b2 may be bias terms.

Figure 4:
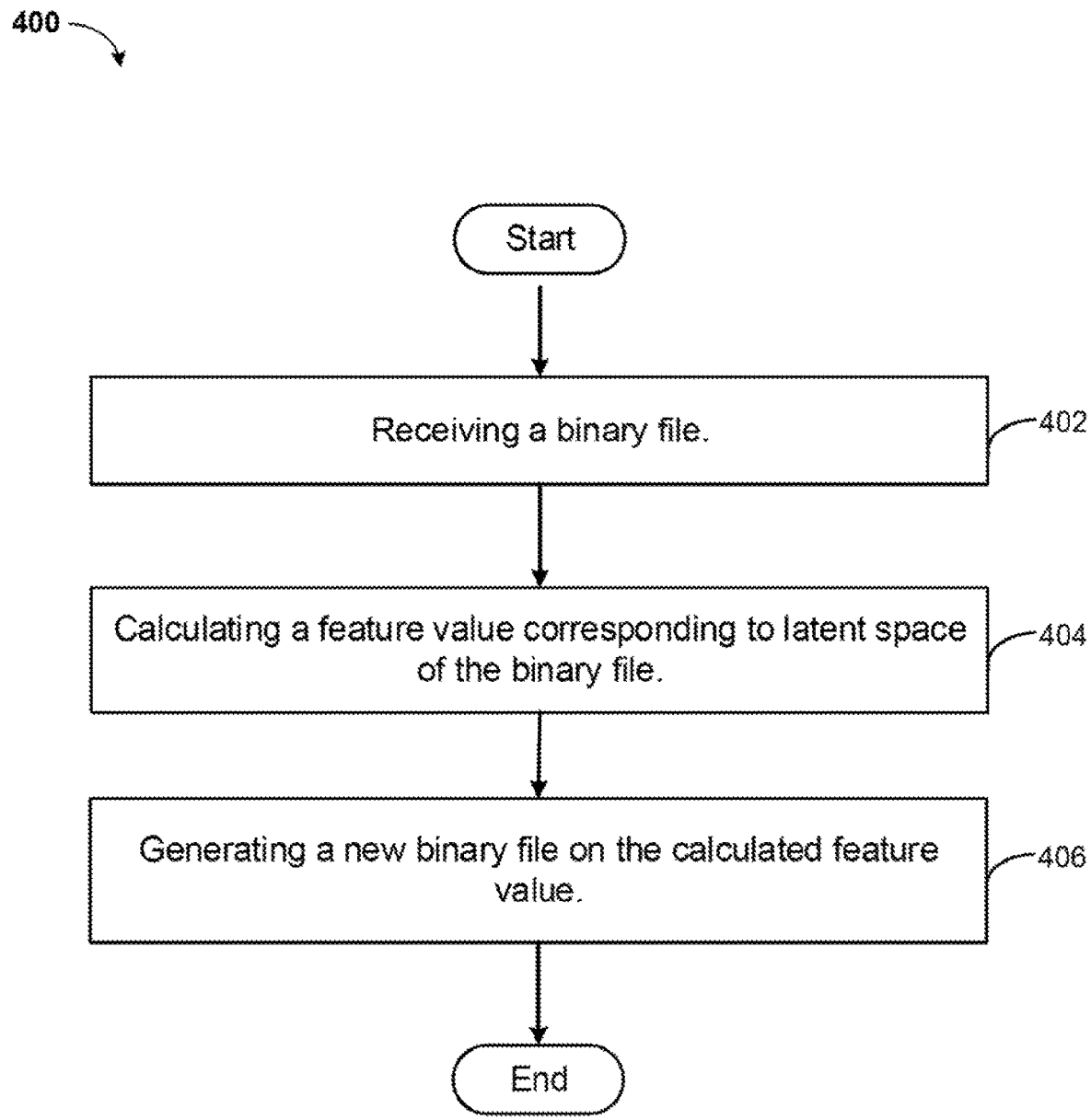
FIG. 4 is an operational flowchart illustrating the steps carried out by a program that predicts features in binary files, according to at least one embodiment.

Referring now to FIG. 4, an operational flowchart 400 illustrating the steps carried out by a program that predicts features in binary files is depicted. FIG. 4 may be described with the aid of FIGS. 1-3. As previously described, the Feature Prediction Program 116 (FIG. 1) may quickly and effectively predict features and their boundaries present in binary files.

At operation 402, a binary file is received. The binary file may correspond to an image, a video, an animation, and a sound. For example, the binary file may correspond to a histological image stained by hematoxylin and eosin. In operation, the Feature Prediction Program 116 (FIG. 1) on the server computer 114 (FIG. 1) may receive one or more input images 208 (FIG. 2) from the computer 102 (FIG. 1) over the communication network 110 (FIG. 1) or may retrieve the input images 208 from the database 112 (FIG. 1).

At operation 404, a feature value corresponding to latent space of the binary file is calculated. This may include determining one or more attention priors are determined from the received input binary file. One or more probability maps may be calculated based on the one or more determined attention priors. An instance mask may be generated from the one or more calculated probability masks. The instance mask may correspond to isolated features associated with the one or more binary files.

For example, the attention priors may correspond to a hematoxylin channel extracted from the stained slide images. The attention priors may be determined by color-normalizing the stained slide images, factorizing the color-normalized slide images into a stain color matrix and an optical density factor, and separating the factorized images into the hematoxylin channel and an eosin channel. The probability maps may correspond to a processed attention feature map and a hematoxylin and eosin feature map extracted from the received images. The probability maps may be calculated by translating the processed attention feature map and the hematoxylin and eosin feature map to a first intermediate value using one or more first convolution kernels and performing element-wise addition and non-linear transformation on the first intermediate value through a rectified linear unit and one or more second convolution kernels to generate a second intermediate value. One or more coefficients may be generated from the second intermediate value using a sigmoid function, and one or more probability map values may be generated through element-wise multiplication of the one or more coefficients with the hematoxylin and eosin feature map and one or more third convolution kernels.

In operation, the pre-processing module 202 (FIG. 2) may generate attention priors from the received input images 208 (FIG. 2). The input nodes 302A-302X (FIG. 3) of the DEAU 204 (FIG. 2) may receive the input images 208. The attention prior processing nodes 304A-304X (FIG. 3) of the DEAU 204 may receive the attention priors from the pre-processing module 202. The attention skip modules 306A-306X (FIG. 3) and the output modules 308A-308X (FIG. 3) of the DEAU 204 may generate a two-channel output containing a feature map and a boundary map. The post-processing module 206 (FIG. 2) may receive the feature map and the boundary map from the DEAU 204 and may output feature prediction data 210 (FIG. 2) for use as an instance mask based on the feature map and the boundary map.

At operation 406, generating a new binary file on the calculated feature value. The new binary file may be similar to the input binary file. In operation, the Feature Prediction Program 116 (FIG. 1) may create a new file from the feature prediction data 210 (FIG. 2) and may store the file in the database 112 (FIG. 1) or may transfer the file to the computer 102 (FIG. 1) over the communication network 110 (FIG. 1).

It may be appreciated that FIG. 4 provides only an illustration of one implementation and does not imply any limitations with regard to how different embodiments may be implemented. Many modifications to the depicted environments may be made based on design and implementation requirements.

Figure 5:
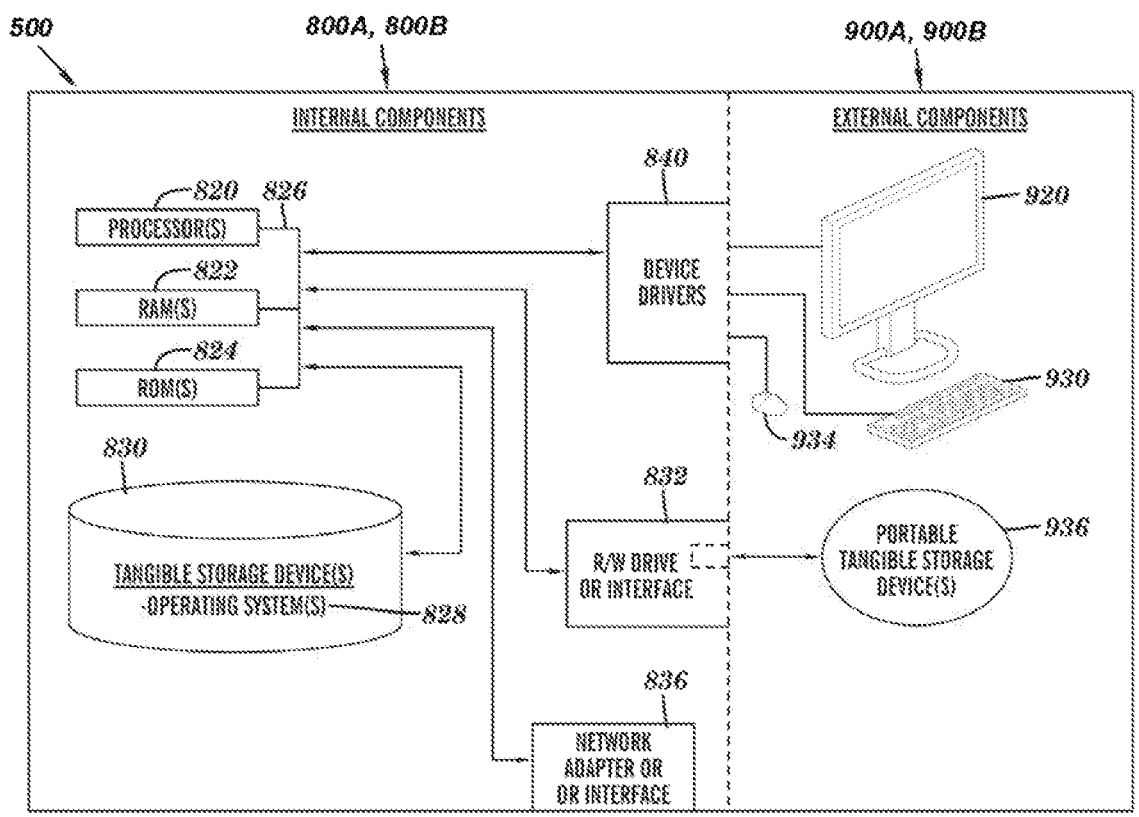
FIG. 5 is a block diagram of internal and external components of computers and servers depicted in FIG. 1 according to at least one embodiment.

FIG. 5 is a block diagram of internal and external components of computers depicted in FIG. 1 in accordance with an illustrative embodiment. It should be appreciated that FIG. 5 provides only an illustration of one implementation and does not imply any limitations with regard to the environments in which different embodiments may be implemented. Many modifications to the depicted environments may be made based on design and implementation requirements.

Computer 102 (FIG. 1) and server computer 114 (FIG. 1) may include respective sets of internal components 800A,B and external components 900A,B illustrated in FIG. 4. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A,B.

The one or more operating systems 828, the software program 108 (FIG. 1) and the Feature Prediction Program 116 (FIG. 1) on server computer 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A,B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Feature Prediction Program 116 (FIG. 1) can be stored on one or more of the respective portable computer-readable tangible storage devices 936, read via the respective R/W drive or interface 832 and loaded into the respective hard drive 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Feature Prediction Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the Feature Prediction Program 116 on the server computer 114 are loaded into the respective hard drive 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, some embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
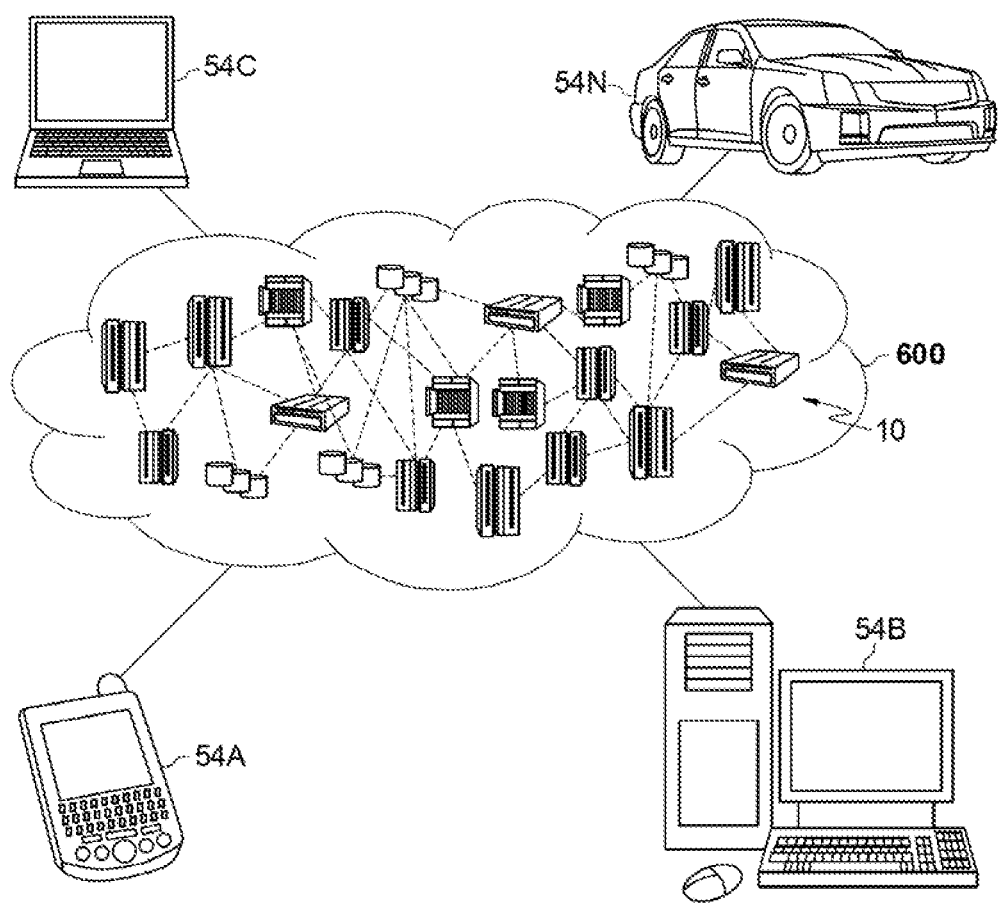
FIG. 6 is a block diagram of an illustrative cloud computing environment including the computer system depicted in FIG. 1, according to at least one embodiment.

Referring to FIG. 6, illustrative cloud computing environment 600 is depicted. As shown, cloud computing environment 600 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 54A-N shown in FIG. 6 are intended to be illustrative only and that cloud computing nodes 10 and cloud computing environment 600 can communicate with any type of computerized device over any type of network and/or network addressable connection (e.g., using a web browser).

Figure 7:
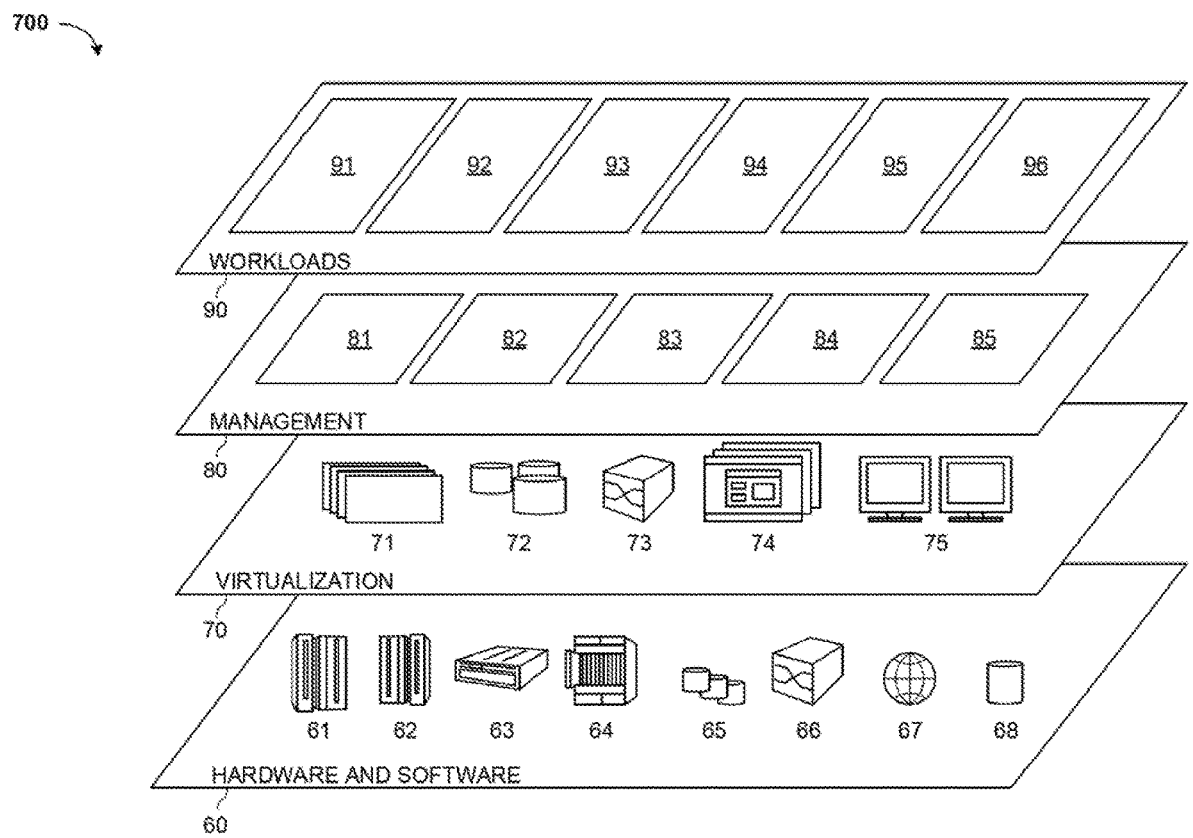
FIG. 7 is a block diagram of functional layers of the illustrative cloud computing environment of FIG. 6, according to at least one embodiment.

Referring to FIG. 7, a set of functional abstraction layers 700 provided by cloud computing environment 600 (FIG. 6) is shown. It should be understood in advance that the components, layers, and functions shown in FIG. 7 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Feature Prediction 96. Feature Prediction 96 may predict features and corresponding boundaries from a binary file (e.g., an image) using a convolutional neural network.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of predicting features in binary files, executable by a processor, the method comprising:
    receiving a binary file;
    calculating a feature value corresponding to latent space of the binary file, wherein calculating the feature value comprises calculating one or more probability maps based on one or more determined attention priors, and wherein the one or more probability maps correspond to a processed attention feature map and a hematoxylin and eosin feature map; and
    generating a new binary file on the calculated feature value,
    wherein calculating the one or more probability maps comprises:
    translating the processed attention feature map and the hematoxylin and eosin feature map to a first intermediate value using one or more first convolution kernels; and
    performing element-wise addition and non-linear transformation on the first intermediate value through a rectified linear unit and one or more second convolution kernels to generate a second intermediate value,
    wherein the feature value is calculated by a dual-encoder attention-based U-net architecture comprising:
        a dual-encoder u-net, comprising:
        one or more input nodes,
        one or more attention prior processing nodes, and
        wherein the one or more input nodes are connected by a max pooling layer, and the one or more attention prior processing nodes are connected by the max pooling layer,
        wherein a first input node, among the one or more input nodes, corresponds to a first attention prior processing node, among the one or more attention prior processing nodes, and
        wherein the first input node and the first attention prior processing node are connected to a corresponding first attention skip module, among one or more attention skip modules, by a skip connection.

2. The method of claim 1, wherein the dual-encoder attention-based U-net architecture comprises:
    a pre-processing module; and
    a post-processing module,
    wherein the dual-encoder u-net further comprises:
    one or more output nodes.

3. The method of claim 1, wherein the received binary file comprises at least one from among an image, an animation, a video, and a sound.

4. The method of claim 1, wherein calculating the feature value comprises:
    determining the one or more attention priors from the received binary file; and
    generating an instance mask from the one or more probability maps, wherein the instance mask corresponds to predicted features associated with the binary files.

5. The method of claim 4, wherein the received binary file corresponds to slide images of one or more cells stained with hematoxylin and eosin dyes.

6. The method of claim 5, wherein the one or more attention priors correspond to a hematoxylin channel extracted from the slide images.

7. The method of claim 6, wherein determining the one or more attention priors comprises:
color-normalizing the slide images;
factorizing the color-normalized slide images into a stain color matrix and an optical density factor; and
separating the factorized color-normalized slide images into the hematoxylin channel and an eosin channel.

8. The method of claim 1, wherein calculating the one or more probability maps further comprises:
generating one or more coefficients from the second intermediate value using a sigmoid function; and
generating one or more probability map values through element-wise multiplication of the one or more coefficients with the hematoxylin and eosin feature map and one or more third convolution kernels.

9. The method of claim 8, further comprising back-propagating the one or more coefficients and the one or more probability map values to the one or more first, second, and third convolution kernels.

10. A computer system for predicting features in binary files, the computer system comprising:
one or more computer-readable non-transitory storage media configured to store computer program code; and
one or more computer processors configured to access said computer program code and operate as instructed by said computer program code, said computer program code including:
receiving code configured to cause the one or more computer processors to receive a binary file;
calculating code configured to cause the one or more computer processors to calculate a feature value corresponding to latent space of the binary file, wherein to calculate the feature value comprises to calculate one or more probability maps based on one or more determined attention priors, and wherein the one or more probability maps correspond to a processed attention feature map and a hematoxylin and eosin feature map; and
generating code configured to cause the one or more computer processors to generate a new binary file on the calculated feature value,
wherein the calculating code is further configured to cause the one or more computer processors to calculate the one or more probability maps by:
translating the processed attention feature map and the hematoxylin and eosin feature map to a first intermediate value using one or more first convolution kernels; and
performing element-wise addition and non-linear transformation on the first intermediate value through a rectified linear unit and one or more second convolution kernels to generate a second intermediate value,
wherein the calculating code is further configured to cause the one or more computer processors to calculate the feature value using a dual-encoder attention-based U-net architecture comprising a dual-encoder u-net comprising one or more input nodes and one or more attention prior processing nodes,
wherein the one or more input nodes are connected by a max pooling layer, and the one or more attention prior processing nodes are connected by the max pooling layer,
wherein a first input node, among the one or more input nodes, corresponds to a first attention prior processing node, among the one or more attention prior processing nodes, and
wherein the first input node and the first attention prior processing node are connected to a corresponding first attention skip module, among one or more attention skip modules, by a skip connection.

11. The computer system of claim 10, wherein the received binary file comprises at least one from among an image, an animation, a video, and a sound.

12. The computer system of claim 10, wherein calculating the feature value comprises:
determining the one or more attention priors from the received binary file; and
generating an instance mask from the one or more probability maps, wherein the instance mask corresponds to predicted features associated with the binary files.

13. The computer system of claim 12, wherein the received binary file corresponds to slide images of one or more cells stained with hematoxylin and eosin dyes.

14. The computer system of claim 13, wherein the one or more attention priors correspond to a hematoxylin channel extracted from the slide images.

15. The computer system of claim 14, wherein determining the one or more attention priors comprises:
color-normalizing the slide images;
factorizing the color-normalized slide images into a stain color matrix and an optical density factor; and
separating the factorized color-normalized slide images into the hematoxylin channel and an eosin channel.

16. The computer system of claim 10, wherein calculating the one or more probability maps comprises:
generating one or more coefficients from the second intermediate value using a sigmoid function; and
generating one or more probability map values through element-wise multiplication of the one or more coefficients with the hematoxylin and eosin feature map and one or more third convolution kernels.

17. A non-transitory computer readable medium having stored thereon a computer program for predicting features in binary files, the computer program configured to cause one or more computer processors to:
receive a binary file;
calculate a feature value corresponding to latent space of the binary file, wherein to calculate the feature value comprises to calculate one or more probability maps based on one or more determined attention priors, and wherein the one or more probability maps correspond to a processed attention feature map and a hematoxylin and eosin feature map;
translate the processed attention feature map and the hematoxylin and eosin feature map to a first intermediate value using one or more first convolution kernels;
perform element-wise addition and non-linear transformation on the first intermediate value through a rectified linear unit and one or more second convolution kernels to generate a second intermediate value; and
generate a new binary file on the calculated feature value,
wherein the calculating feature value comprises calculating the feature value using a dual-encoder attention-based U-net architecture comprising a dual-encoder u-net comprising one or more input nodes and one or more attention prior processing nodes,
wherein the one or more input nodes are connected by a max pooling layer, and the one or more attention prior processing nodes are connected by the max pooling layer, wherein a first input node, among the one or more input nodes, corresponds to a first attention prior processing node, among the one or more attention prior processing nodes, and wherein the first input node and the first attention prior processing node are connected to a corresponding first attention skip module, among one or more attention skip modules, by a skip connection.

\* \* \* \* \*